(12) United States Patent
Botts et al.

(10) Patent No.: US 11,463,639 B2
(45) Date of Patent: Oct. 4, 2022

(54) PROGRAMMABLE DIGITAL TDI EO/IR SCANNING FOCAL PLANE ARRAY WITH MULTIPLE SELECTABLE TDI SUB-BANKS

(71) Applicant: RAYTHEON COMPANY, Waltham, MA (US)

(72) Inventors: Steven Botts, Santa Barbara, CA (US); Bryan W. Kean, Denver, CO (US); Richard J. Peralta, Santa Barbara, CA (US); John L. Vampola, Goleta, CA (US); Micky R. Harris, Lompoc, CA (US)

(73) Assignee: RAYTHEON COMPANY, Waltham, MA (US)

( * ) Notice: Subject to any disclaimer, the term of this patent is extended or adjusted under 35 U.S.C. 154(b) by 1 day.

(21) Appl. No.: 17/091,689

(22) Filed: Nov. 6, 2020

(65) Prior Publication Data

US 2021/0105425 A1    Apr. 8, 2021

Related U.S. Application Data

(62) Division of application No. 16/426,863, filed on May 30, 2019, now Pat. No. 10,834,346.
(Continued)

(51) Int. Cl.
*H04N 5/369* (2011.01)
*H04N 5/33* (2006.01)
(Continued)

(52) U.S. Cl.
CPC ......... *H04N 5/36961* (2018.08); *H04N 5/332* (2013.01); *H04N 5/3592* (2013.01); *H04N 5/378* (2013.01); *H04N 5/37213* (2013.01)

(58) Field of Classification Search
CPC ........ H04N 5/332; H04N 5/345; H04N 5/378; H04N 5/3456; H04N 5/3592;
(Continued)

(56) References Cited

U.S. PATENT DOCUMENTS 6,678,048 B1 * 1/2004 Rienstra ................ G01J 3/2803
356/419
8,463,078 B2    6/2013 Goodnough et al.
(Continued)

FOREIGN PATENT DOCUMENTS

EP          3107281 A1    12/2016
WO     2009026522 A1     2/2009
(Continued)

OTHER PUBLICATIONS

Invitation to Pay Additional Fees and partial Search Report for International Application No. PCT/US2019/034655 dated Sep. 9, 2019.
(Continued)

*Primary Examiner* — Peet Dhillon
(74) *Attorney, Agent, or Firm* — Lando & Anastasi, LLP

(57) ABSTRACT

A TDI scanner including a dynamically programmable focal plane array including a two-dimensional array of detectors arranged in a plurality of columns and a plurality of rows, the array being divided into a plurality of banks separated from one another by gap regions, each bank including a plurality of sub-banks, and each sub-bank including at least one row of detectors, a ROIC coupled to the focal plane array and configured to combine in a TDI process outputs from detectors in each column of detectors in each sub-bank, and a controller configured to program the focal plane array to selectively and dynamically set characteristics of the focal plane array, the characteristics including a size and a location within the two-dimensional array of each of the plural-
(Continued)

ity of sub-banks and the gap regions, the size corresponding to a number of rows of detectors included in the respective sub-bank or gap region.

20 Claims, 4 Drawing Sheets

Related U.S. Application Data

(60) Provisional application No. 62/678,373, filed on May 31, 2018.

(51) Int. Cl.
*H04N 5/359* (2011.01)
*H04N 5/372* (2011.01)
*H04N 5/378* (2011.01)

(58) Field of Classification Search
CPC ............ H04N 5/3743; H04N 5/36961; H04N 5/37206; H04N 5/37213
See application file for complete search history.

(56) References Cited

U.S. PATENT DOCUMENTS

| | | | |
|---|---|---|---|
| 8,629,387 B2 * | 1/2014 | Pflibsen | H04N 5/3743 250/208.1 |
| 9,438,798 B2 | 9/2016 | Buell et al. | |
| 2003/0193589 A1 * | 10/2003 | Lareau | H04N 3/1525 348/294 |
| 2005/0018899 A1 * | 1/2005 | Elyasaf | G06T 7/001 382/145 |
| 2015/0136955 A1 * | 5/2015 | Wein | G01J 3/2823 250/208.1 |
| 2016/0373678 A1 * | 12/2016 | Hulsken | G02B 21/365 |
| 2016/0373679 A1 * | 12/2016 | Rosmeulen | B64D 47/08 |
| 2018/0295310 A1 * | 10/2018 | Zapor | H04N 5/332 |

FOREIGN PATENT DOCUMENTS

| | | | | |
|---|---|---|---|---|
| WO | WO-2009026522 A1 * | 2/2009 | | G06T 3/40 |
| WO | 2011080670 A1 | 7/2011 | | |

OTHER PUBLICATIONS

International Search Report and Written Opinion of International Application No. PCT/US2019/034655 dated Oct. 31, 2019.

* cited by examiner

PROGRAMMABLE DIGITAL TDI EO/IR SCANNING FOCAL PLANE ARRAY WITH MULTIPLE SELECTABLE TDI SUB-BANKS

CROSS-REFERENCE TO RELATED APPLICATIONS

This application claims priority under 35 U.S.C. § 121 as a division of U.S. patent application Ser. No. 16/426,863, titled "PROGRAMMABLE DIGITAL TDI EO/IR SCANNING FOCAL PLANE ARRAY WITH MULTIPLE SELECTABLE TDI SUB-BANKS," filed May 30, 2019, which claims priority under 35 U.S.C. § 119(e) to U.S. Provisional Application No. 62/678,373 filed on May 31, 2018. Each application referenced above is herein incorporated by reference in its entirety for all purposes.

GOVERNMENT LICENSE RIGHTS

This invention was made with government support. The government has certain rights in the invention.

BACKGROUND

Time Delay and Integration (TDI) image sensors are commonly used to capture images of moving objects. Current generation electro-optical infrared (EO/IR) scanning TDI focal plane arrays are designed with specific configurations in mind, particularly the number of elements combined in the TDI operation, the gain and/or capacity of the unit cells, the number of differing spectral bands, and the line rate or speed of scanning. When these parameters are specified, the focal plane array design is usually constructed in response to the requirements and is inflexible to varying configuration specifications. For example, the number of rows combined in each TDI operation, and the number of separate bands in multi-spectral designs, are typically specified and set during the design phase. Thus, conventional scanners generally have a fixed configuration of rows to be combined in TDI. In addition, conventional scanners typically have a fixed gap between banks of TDI rows for mounting spectral filters.

Infrared focal plane array production inherently involves low yield considerations. However, because conventional scanners have a fixed configuration of detectors and read-out integrated circuitry (ROIC) unit cells, low yields are tolerated. Further, power usage is not tailorable; conventional scanners operate with all rows "on" all the time. In addition, scanners are designed with margin for expected illumination conditions in the application for which the scanner is designed. Thus, if application-based illumination calculations change, the scanner must be redesigned. Conventional design processes may not anticipate over-illumination of the focal plane array or the negative effects of excessive illumination. Some design practices have allowed for programmable gain selections, and other design practices have implemented "charge drains" to eliminate excessive charge. However, scanners may still saturate and over-load in the presence of excessive illumination.

SUMMARY OF THE INVENTION

Aspects and embodiments are directed to TDI scanners that allow configuration flexibility in the assignment of sizes of TDI sub-banks (the number of unit cells, rows, or columns used in TDI), the number of TDI sub-banks, and the locations of the TDI banks and gaps between banks. According to certain aspects, this configurability is flexible and dynamic, and allows for improved production yield and/or imaging performance over conventional TDI scanners with fixed configurations.

According to one embodiment, a TDI scanner comprises a dynamically programmable focal plane array including a two-dimensional array of detectors arranged in a plurality of columns and a plurality of rows, the array of detectors being divided into a plurality of banks separated from one another by gap regions, each bank including a plurality of sub-banks, and each sub-bank including at least one row of detectors. The TDI scanner further comprises a read-out integrated circuit (ROIC) coupled to the focal plane array, the ROIC being configured to combine in a TDI process outputs from detectors in each column of detectors in each sub-bank to provide, for each sub-bank, a plurality of column output values, and a controller configured to program the focal plane array to selectively and dynamically set characteristics of the focal plane array, the characteristics including a size and a location within the two-dimensional array of each of the plurality of sub-banks, the size corresponding to a number of rows of detectors included in the respective sub-bank, and locations of the gap regions within the two-dimensional array.

In one example, the TDI scanner is configured to sequentially activate the rows of detectors to scan a field of view of the focal plane array across a scene to be imaged at a line rate, and the controller is configured to reprogram at least some of the characteristics of the focal plane array within a time period corresponding to the line rate.

In another example, detectors within the two-dimensional array corresponding to the gap regions are inactive in the TDI process and are shunted to ground.

In one example, each bank includes at least one sub-bank having a first gain state and at least one sub-bank having a second gain state different from the first gain state, and the controller is further configured to dynamically reprogram gain states of the plurality of sub-banks in each bank.

In another example, the TDI scanner further comprises a filter disposed in at least one of the gap regions. The filter may be a spectral filter or a neutral density filter, for example.

In another example, at least some detectors in each of the sub-banks include a charge drain to prevent excess charge over a saturation limit of the respective detector from being accumulated. In one example, the controller is configured to exclude saturated detectors from the TDI process.

Another embodiment is directed to a method of operating a Time Delay and Integration (TDI) scanning sensor that includes a focal plane array having a plurality of banks of imaging detectors, each bank divided into a plurality of sub-banks of the imaging detectors. The method may comprise scanning a field of view of the sensor across a scene to be imaged, collecting image data from each of the plurality of sub-banks, analyzing the image data from each of the plurality of sub-banks to determine whether a sub-bank in the plurality of sub-banks has been contaminated by over-illumination from an illumination threat present in the scene to be imaged and identifying any contaminated sub-banks, and performing a TDI process on the image data to produce an image of the scene, wherein the image data from the contaminated sub-banks is excluded from the TDI process.

In one example, analyzing the image data from each of the plurality of sub-banks includes comparing the image data from each sub-bank with the image data from each other sub-bank, and identifying a contaminated sub-bank based on differences in the comparison.

In another example, the method further comprises dynamically reconfiguring a number of the plurality of sub-banks included in each of the plurality of banks during the scanning. The method may further comprise dynamically configuring a gain state of at least one of the plurality of sub-banks during the scanning.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
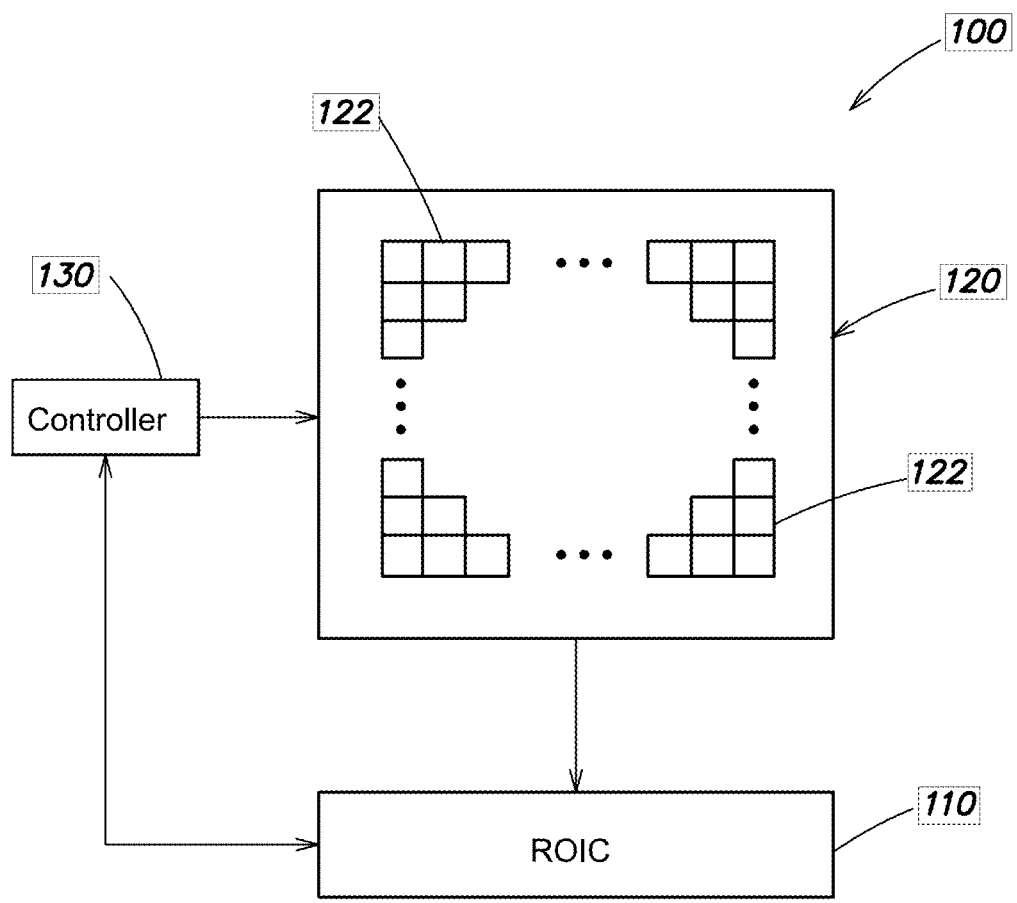
FIG. 1 is a functional block diagram of one example of a scanner according to certain embodiments.

Aspects and embodiments are directed to approaches to constructing a Time Delay and Integration (TDI) scanner that allow configuration flexibility in the assignment of sizes of TDI sub-banks (the number of unit cells, rows, or columns used in TDI), the number of TDI sub-banks, and the locations of the TDI banks and gaps between banks.

Embodiments of the scanners disclosed herein can accommodate changing multi-spectral filter assemblies from application to application. As discussed above, conventional scanners have a fixed gap between TDI banks where spectral filters can be mounted. In contrast, embodiments of the scanners disclosed herein allow for programmable selection of the gap distance. In addition, as discussed further below, by selecting the best rows from a large two-dimensional array and electrically using the best combinations, improved production yield and/or imaging performance can be achieved.

According to certain embodiments, a scanner may have a very high line rate with many spectral bands (e.g., tens of bands). In addition, embodiments may allow for dynamic changing of the scan rate. As discussed above, conventional scanners operate with all the rows "on" all the time. In contrast, embodiments of the scanners disclosed herein allow one or more selected row(s) to be disabled to save power.

As discussed above, conventional design processes may not anticipate over-illumination of the focal plane array or the deleterious effects of excessive illumination. Most design processes do not attempt to dis-allow performing TDI in the presence of excessive charge; that is, if a TDI channel is degraded by excessive illumination it is accepted as a bad acquisition and the data is discarded in subsequent downstream processing. In contrast, embodiments of the scanners disclosed herein include circuitry configured to prevent excess illumination or charge to prevent corruption of data in the TDI engine. In addition, embodiments provide for selection of different gain values with different TDI banks.

According to certain aspects, this configurability is flexible and dynamic (e.g., can be updated in much less than a line time). Some conventional design practices have allowed for limited programmability, such as programmable gain selection. Certain conventional designs have implemented "charge drains" to attempt to handle excessive charge, and some have shunted unused detector material in between specified TDI banks and spectral bands. Certain conventional designs have attempted to implement wide dynamic range by having neutral density (ND) filters over a few rows on a focal plane while combining many rows in TDI on other rows in the focal plane. However, previously no design has made all of these concepts programmable on a single chip to create a very flexible configuration scanning EO/IR focal plane array, as may be achieved with embodiments of the scanners disclosed herein.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Aspects and embodiments are directed to a programmable digital TDI EO/IR scanning focal plane array with multiple selectable TDI sub-banks providing a flexible general-purpose scanner. Referring to FIG. 1, according to certain embodiments, a scanner 100 includes a readout integrated circuit (ROIC) 110 that is paired a large two-dimensional array 120 of detector unit cells ("pixels") 122. All of the pixels 122 within the array 120 are available to activate and access for programming into various configurations of sub-banks of pixels. The programming may be performed or controlled by a controller 130. The controller 130 may be part of or integrated with the ROIC 110 or may be a separate component. A sub-bank is an array of detectors 122 that has many columns (e.g., 100 to 1000s) and relatively few rows (e.g., tens). As used herein, the term "column" is intended to refer to a collection of pixels 122 within the array 120 arranged in a scanning direction of the array, and the term "row" is intended to refer to a collection of pixels 122 arranged in a cross-scan direction (orthogonal to the scanning direction). Within each TDI sub-bank, at least some of the pixels 122 in a column are combined in TDI. The data from each column of combined pixels can be sent out as a single digital number of TDI combined data per column. As discussed further below, the scanner 100 may have many independent TDI sub-banks that are selected from the large two-dimensional array 120 of detectors 122. The sub-banks can be dynamically reconfigured in size and shape (i.e., how many rows and columns of pixels 122 are included in any sub-bank) and location within the array 120 (i.e., which rows and columns of pixels 122 are included in any sub-bank).

Figure 2:
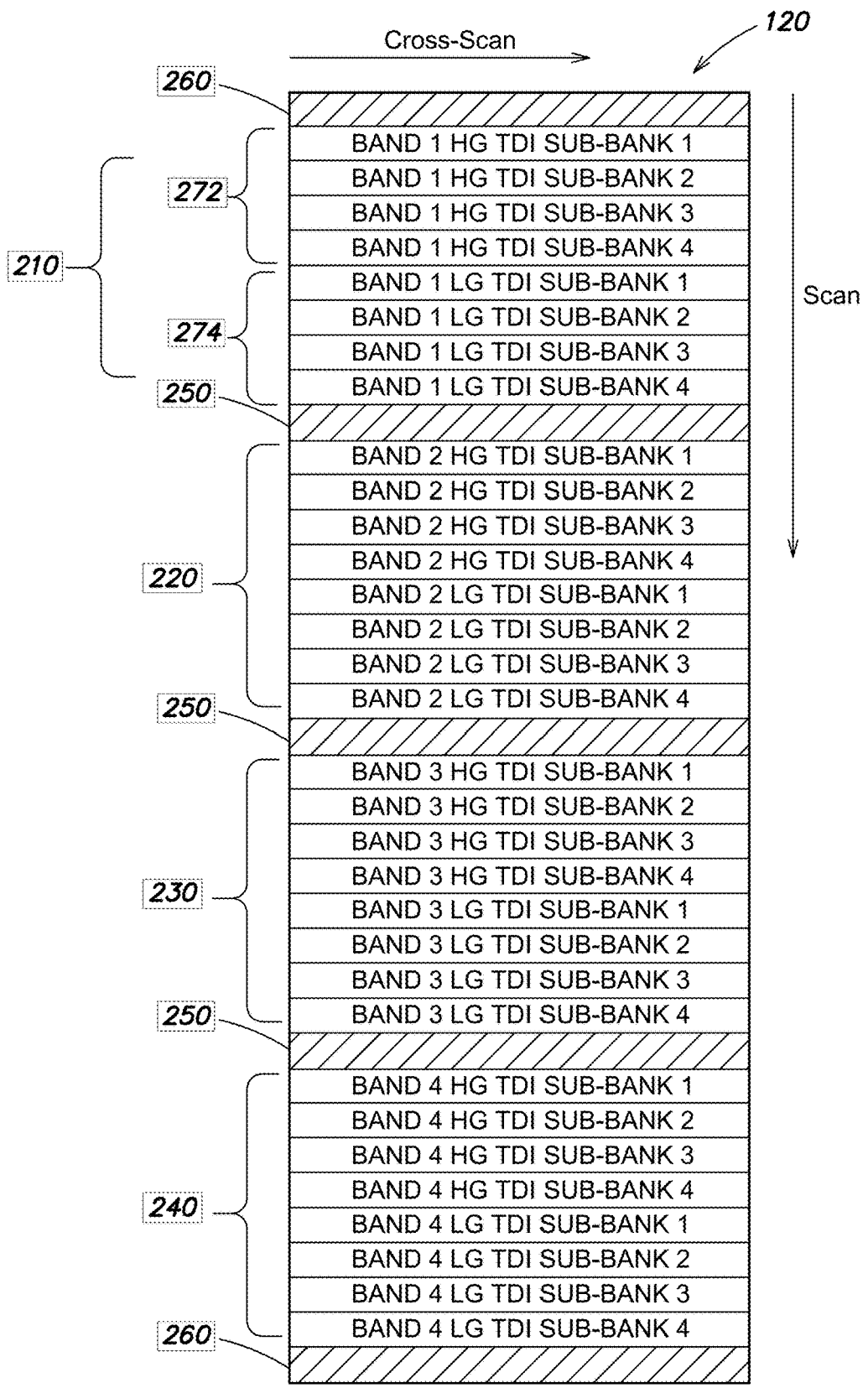
FIG. 2 is a block diagram of one example of an architecture for a scanning focal plane array according to certain embodiments.

FIG. 2 shows an example of an architecture of the detector array 120 according to one embodiment of the scanner 100. In this example, the scanner 100 is configured to nominally operate with four spectral (optical) bands, having corresponding "banks" of detectors 210, 220, 230, 240 and a filter gap 250 is provided between the banks corresponding to each spectral band, as shown. The detector array 120 may further include filter bezels 260 positioned at outer boundaries of the array, as shown in FIG. 2. In the illustrated example, there are two gain states per bank (namely, a "high gain" (HG) state and a "low gain" (LG) state). Within each bank 210, 220, 230, 240, the detector array 120 is configured to include a plurality of "high gain" TDI sub-banks 272 and a plurality of "low-gain" TDI sub-banks 274. In this example of the scanner 100, each bank 210, 220, 230, 240 includes four "high gain" TDI sub-banks 272 and four "low gain" TDI sub-banks 274. However, in other examples one or more of the banks 210, 220, 230, 240 may include more or fewer high-gain TDI sub-banks 272 or low-gain TDI sub-banks 274. Each bank 210, 220, 230, 240 need not include the same number of high-gain TDI sub-banks 272 as low-gain TDI sub-banks 274, and the number of high-gain TDI sub-banks 272 and/or low-gain TDI sub-banks 274 may vary from one bank to another. In one example, each sub-bank includes 8 pixels in TDI. Thus, the scanner may have 256 total pixels in TDI, targeting 32 total lines per frame. Those skilled in the art will readily appreciate in view of this disclosure that the number of banks, gain states, sub-banks per gain state/spectral band, and number of pixels per sub-bank can all vary, and embodiments of the scanners are not limited to the particular example shown in FIG. 1.

According to certain embodiments, the size and certain characteristics of each individual sub-bank 272, 274 are configurable. For example, the number of pixels combined in TDI and the gain selection may be programmable. Each sub-bank 272, 274 may operate independently from the others in terms of the number of pixels combined in TDI and the selection of gain for that sub-bank. Thus, the sub-banks can be programmed to have differing gain states and differing numbers in TDI. By controlling the number of pixels combined in TDI, the line rate can be made very fast when necessary. In certain examples, the scanner can operate at a line rate of 8 klps with at least 256 pixels in TDI. The scanner may operate faster than 16 klps with a reduced number of pixels in TDI and sub-banks.

According to certain embodiments, the regions (gaps) 250 where filters may be placed between sub-banks are flexible and programmable. For example, the filter gaps 250 can be configurable in their dimensions and location. As discussed above, the sizes (e.g., how many of rows of pixels included) and locations of the sub-banks 272, 274 in each of the banks 210, 220, 230, 240 within the large two-dimensional array 120 of detectors 122 are programmable. Accordingly, the sizes and locations of the filter gaps 250 are also programmable. For example, depending on the physical sizes of spectral and neutral density filters as well as other coatings that may be used in the scanner, the sizes of the filter gaps 250 can be configured through programming to accommodate a wide variety of different filters. The detectors 122 in the filter gap regions 250 can be shunted to ground (as they may not be used for imaging), and the corresponding rows of unused detectors 122 can be deselected in the ROIC 110 to minimize power. Thus, embodiments allow for differing neutral density filters, such that a wide input scene dynamic range is achievable over a multi-bank TDI EO/IR scanning focal plane array. Further embodiments allow for differing spectral filters such that multi-spectral scanning is achievable over a multi-bank TDI scanning EO/IR focal plane array.

Thus, according to certain embodiments, locations of the filter gaps 250, the number, sizes, and locations of TDI sub-banks within the array 120, the numbers of detectors 122 used in TDI combinations within any of the sub-banks, and active and inactive rows of detectors 122 are all dynamically programmable (e.g., line time by line time) using the controller 130. In addition, according to certain embodiments, various detectors 122 in the large two-dimensional array 120 can be individually deselected from the population to prevent them from contaminating sub-banks and the TDI process. Thus, embodiments provide programmable defective pixel deselection to improve operability of the scanner 100.

Figure 3:
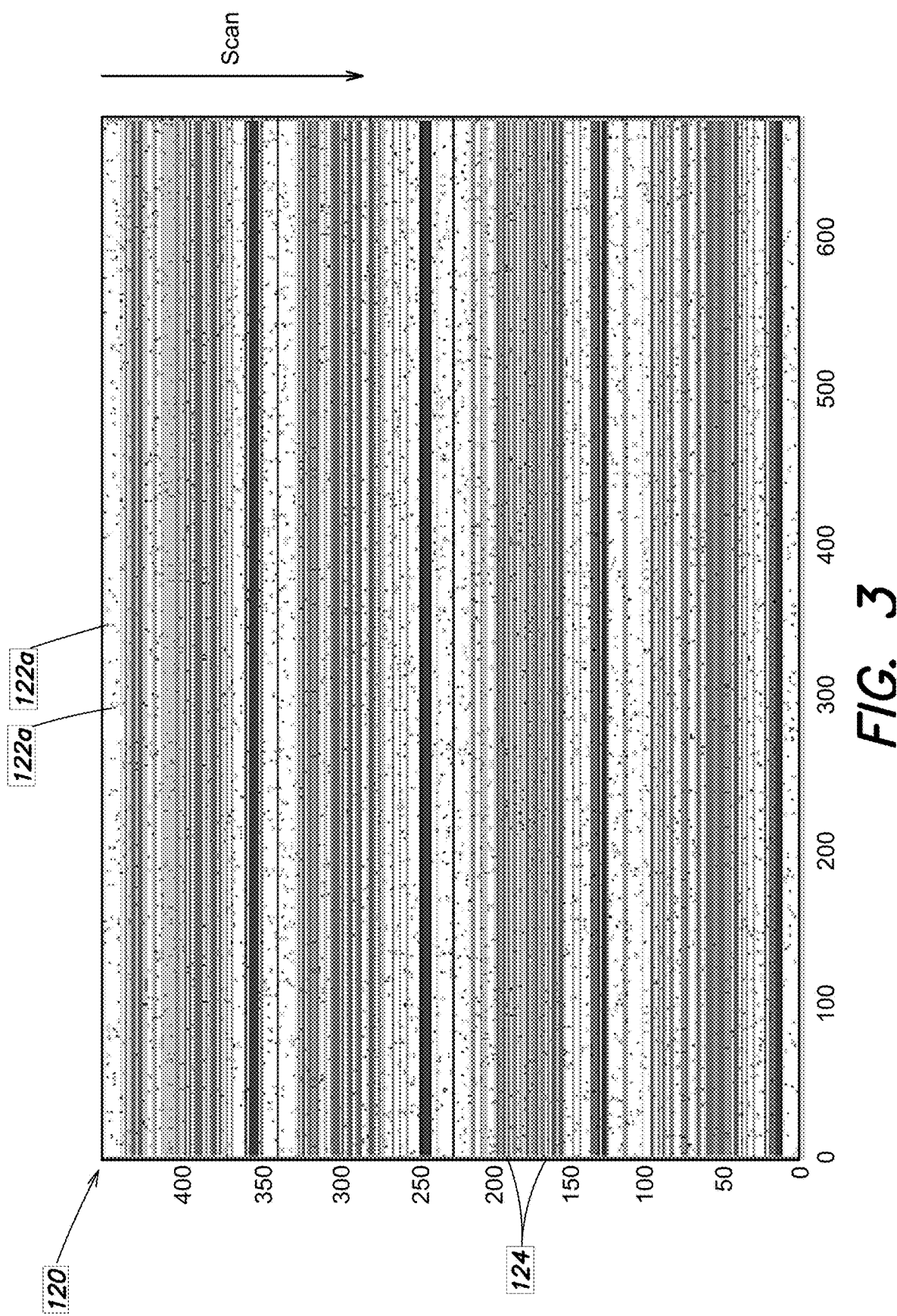
FIG. 3 is a diagram of one example of a scanning focal plane array according to certain embodiments.

FIG. 3 illustrates an example of the detector array 120, showing how certain rows of detectors 122 can be selected and others deselected to achieve improved yield in array manufacture and scanner performance. After fabrication of the array 120, the actual array defect/outage population of pixels 122 can be tested, and the rows that have the best operability/lowest dark current can be selected. In FIG. 3, "dots" 122a represent defective pixels 122. According to certain embodiments, for each bank 210, 220, 230, 240, the rows (e.g., 124) with the fewest defective pixels can be selected, and those selected rows can then be used to populate columns of pixels in TDI for each sub-bank. For example, in a scanner 100 where the array 120 is configured with 63 rows per bank 210, 220, 230, 240, the best 32 rows may be selected for each band. The ability to dynamically select rows of the array 120 and deselect (not use) those rows with high numbers of defective pixels allows good performance to be achieved at higher yield rates without introducing more stringent manufacturing requirements.

As discussed above, in certain embodiments, the controller 130 and/or ROIC 110 can be configured to "blank" or shunt to ground certain individual detectors 122 or rows of detectors. This can be done when those detectors 122 or rows of detectors are not being used in TDI, as discussed above. Allowing for non-selected rows of detectors to be shunted to ground may avoid contributing excess charge to the detector substrate. Detectors can also be shunted to ground, and/or otherwise configured to drain excess charge (e.g., above a specified saturation level of the detector 122) to prevent excess charge from being accumulated and/or adversely affecting the TDI process. Thus, in addition to the ability to shunt to ground unused detectors 122 between active sub-banks 272, 274 (e.g., those in the filter gaps 250), embodiments may provide charge drains in active detectors 122 as well to prevent over-saturation conditions that could adversely affect imaging performance. For example, saturation level charge drains may be provided in the circuitry of the detectors 122. In certain examples, each detector (unit cell) 122 may have a 50 ke high-gain well capacity (<50 e of noise) and a 100 ke low-gain well capacity. Examples may support a 1 Me well capacity. Other examples may support 11 ke well capacity.

In imaging applications, saturation or over-saturation of detectors 122 can occur in conditions where the scene viewed by the scanner 100 includes one or more sources of high intensity illumination (e.g., very bright region(s) or object(s) in the scene). Embodiments of the scanner 100 can be configured to "blank" those detectors 122 experiencing saturation-level excess charge from contributing to the TDI process, thereby avoiding the decreased image quality that can result from saturated detectors 122 contributing to and contaminating the TDI process. In certain examples, the array 120 can be configured with in-unit-cell analog circuitry to drain/suppress and/or otherwise blank excess (over the saturation limit) charge from being added to the digital TDI processes. In certain examples, Unit cell analog circuitry is configured to drain saturation level charge and prevent excess charge from being accumulated. The ability to blank those detectors 122 which are experiencing very high illuminations allows for very wide dynamic range across the focal plane array 120. Such situations might be encountered, for example, in a space-based optical sensor that simultaneously measures irradiance in very dark or low light level conditions yet simultaneously or nearly simultaneously experiences very bright or high light level conditions.

In certain applications, when scanning across a scene, region of interest, of field of regard, it is possible that an intense illumination source can be within the field of view of the detector array 120 and potentially saturate and/or damage some of the pixels 122 in the array. For example, when the scanner 100 is operating in a space or airborne environment, there is the potential for the scanner 100 to encounter various threat phenomenology, including gamma induced charges sources, X-Ray induced charge sources, Electro-Magnetic-Pulse (EMP) induced charge sources, prompt high energy particles, and other illumination sources such as lightning, for example. Similarly, operating in a space environment, the potential for energetic particles to disrupt circuitry, and/or create excess charge exists. In additional to natural threats, there is also the possibility that adversaries may intend to defeat the functionality of the scanner 100 by focusing a laser (or other intense illumination source) onto the entrance aperture of the scanner with possibility of damaging, blinding, dazzling, or otherwise disrupting the operation of the scanner. Aspects and embodiments greatly improve the resiliency of the scanner 100 to operate and acquire data in the presence of such threats and events.

Scanning TDI EO/IR focal plane arrays may perform very high sensitivity imaging through the use of many pixels 122 in TDI. However, the larger the TDI number, the more vulnerable the scanner 100 is to the entire TDI channel being corrupted from sources of excess charge. Aspects and embodiments provide a time-agile method to eliminate the minimum amount of data under threat (e.g., only that portion of the TDI record that has been corrupted) and retain most of the un-corrupted data.

A conventional approach for space-borne scanners is to accept the disruption induced by the threat phenomena and wait for the charge, signal voltage, or other effect to subside before resuming normal operation. In conventional CCD approaches to TDI, many line times are required before TDI is accomplished, such that these sensors are particularly vulnerable to disruption by focused laser threats and other natural phenomena. Previous attempts to solve this problem have been performed in the unit cell and have been focused on excess charge deposited by a gamma event. In contrast, aspects and embodiments combine on-focal plane TDI processing with off-focal plane elimination of corrupted sub-banks. According to certain embodiments, an approach to operating a scanning TDI sensor, such as the scanner 100, in the presence of threat environments (including lasers, natural space environmental phenomenology, and lighting, for example) includes providing a distributed arrangement of TDI sub-banks that can accommodate spatial, spectral, and temporal dis-aggregation and recombination, and working in conjunction with an off-focal plane processor, such as the controller 130, to examine collected data to determine whether the data from a particular a TDI sub-bank has been contaminated before recombining. The scanner 100 can be controlled to agilely accept commands to shut-down data collection operations of sub-banks that are operating in the vicinity of a threat phenomenon (e.g., a threat phenomenon is at least partially within the field of view of the sub-bank) and resume collection after the scanner has moved past the threat location. Using this approach, only "clean data" may be combined in TDI, thereby avoiding contamination of the data from threat phenomena.

Using the flexible, programmable detector array 120, readout integrated circuit 110, and controller 130 described above, aspects and embodiments apply off-focal plane electronics (e.g., the ROIC 110 and/or controller 130) to prevent individual sub-banks 272, 274 that have been contaminated by sources of excess charge from being added in TDI with other sub-banks in any given bank 210, 220, 230, 240. According to certain embodiments, the determination of whether a sub-bank 272, 274 has been contaminated is performed by off-focal plane electronics (e.g., the controller 130) by comparing the results of the sub-bank with its peers from within the bank corresponding to a given spectral band. If a suspected contaminated sub-bank is sufficiently different from its peers, it is excluded. As discussed above, in certain examples, the banks 210, 220, 230, 240 may include two types of sub-banks, namely high-gain sub-banks 272 and low-gain sub-banks 274. In other examples, the sub-banks are all homogenous; that is, they are similar in terms of the color, gain, and number in TDI. In another instance, the sub-banks are spectrally adjacent but differing in their spectral content. Aspects and embodiments allow for agile timing control over TDI sub-banks as to whether the sub-banks are actively participating in the TDI process or are isolated and eliminating excess charge and/or current caused by a directed energy laser or other threats to high performance optical sensors.

According to certain aspects, using embodiments of the flexible general purpose EO/IR scanner described above, a normal "bank" (that is, a collection of pixels that are intended to be added in TDI all of which would normally be contiguous pixels, operating in the same color, and in the same gain state) is divided into "sub-banks," which, as discussed above, can be dynamically varied in terms of gain, size, and spatial distribution within the array 120. The digital sub-bank TDI data from these spatially dis-aggregated sub-banks can be combined or not combined in TDI by an off-focal plane TDI processor, such as the controller 130. By virtue of the array 120 being divided into isolated sub-banks that attenuate the response to undesired significant charge sources, the controller 130 can be configured to eliminate the sub-banks that may have excessive charge from a DE laser or other sources of excess charge such as gamma induced charge sources, X-ray induced charge sources, Electro-Magnetic-Pulse (EMP) induced charge sources, prompt high energy particles, and other illumination sources such as lightning, for example. According to certain embodiments, the isolated sub-banks that attenuate the response to undesired significant charge sources, can be controlled in very agile manner to eliminate the entire bank of TDI data throughout the remainder of the scan, the sub-bank of TDI data throughout the remainder of the scan, the TDI bank for the duration of time required for the bank to clear the location in image space of the threat illumination, or the TDI sub-bank for the duration of time required for the sub-bank to clear the location in image space of the threat illumination, and to eliminate TDI processing for very short durations as short as a line time, an integer number of line times, or an arbitrary amount of time ending on a line time boundary thereby by allowing the scanner 100 to exclude data for a duration as short or long as necessary to avoid processing contaminated data.

Similarly, embodiments of the flexible general purpose scanner described above can be used in conjunction with differing spectral filters mounted over various sub-banks to attenuate the response to monochromatic threat illumination. For example, threat laser sources of light may be monochromatic and therefore cannot affect different spectral sub-banks simultaneously, allowing a scanning EO/IR sensor to operate through the laser threat. The off-focal plane processor can determine which sub-banks are degraded and therefore should not be added in the overall TDI combination.

Referring again to FIG. 1, in one example the array 120 includes 32 sub-banks, which provide 32 unique scans of the scene. After scanning in the scan direction (indicated by the arrow labeled "SCAN") and performing TDI within each sub-bank, there are four lines of data for each color, gain setting, and filter selection. As discussed above, a sub-bank can be disrupted, contaminated, or otherwise corrupted by lasers, natural space phenomena, and/or lightning. At any one instant in time, the threat laser, gamma particle, lightning strike, or other threat may be present in a narrow collection of pixels 122 or a single color band. The controller 130 can be used to determine if any particular sub-bank TDI result is "out-of-family" with the others and choose to reject its data, as discussed above. The controller 130 may then reconstruct TDI data eliminating the affected sub-bank(s). In the illustrated example, if any particular sub-bank is corrupted, then that particular color/gain selection would still have the remaining 24 pixels combined in TDI. As discussed above, all of the numbers in this example are reprogrammable, and embodiments are not limited to the particular configuration shown in FIG. 1.

According to certain embodiments, the scanner 100 can be operated in a particular commanded mode to achieve a particular configuration. The array 120 provides spatial and spectral dis-aggregation as a method to operate when various threats are present. Embodiments provide a method to agilely respond to commands from the controller 130 to change modes of operation in response to threats. For example, the scan rate may be changed upon detection of a threat. In another example TDI data collection may be suspended in the entire array 120 upon detection of a threat, and the entire array 120 may be placed into a protected current shunt state, for example. Operation can be resumed upon the next scan, or the current scan may be restarted after the threat has dissipated. Alternatively, TDI data collection may be suspended in specific sub-banks that are operating in the vicinity of a threat, and only those sub-banks may be placed into the protected state. Operation of the suspended sub-banks may be resumed when the specific sub-banks pass the threat location, for example.

Thus, according to certain embodiments, there is provided a programmable digital TDI EO/IR scanning focal plane array with multiple selectable TDI sub-banks arranged to have multiple spatially and/or spectrally dis-aggregated redundant bands for attenuating the response of directed energy lasers and various other threat phenomenology to high performance optical sensors.

In certain examples, the TDI EO/IR scanning focal plane array 120 includes redundant spatial and/or spectral sub-bands, as shown in FIG. 1, for example. The redundant spatial and/or spectral sub-banks may have spatial separation and grounding between the sub-banks to attenuate the response to excess charge contamination/crosstalk/disruption created from a threat, such as a DE laser pulse of light, Gamma induced charges sources, X-Ray induced charge sources, Electro-Magnetic-Pulse (EMP) induced charge sources, prompt high energy particles, and other illumination sources such as lightning. Embodiments can take advantage of the controller 130 to determine if sub-banks have experienced disruptive effects or been corrupted. The controller 130 can be used determine if any of the sub-banks have been corrupted, and make the decision to use or not use the information in the TDI process and subsequent information processing.

Thus, certain embodiments are directed to a programmable digital TDI EO/IR scanning focal plane array with multiple selectable TDI sub-banks arranged to have multiple spatially and/or spectrally dis-aggregated redundant bands for attenuating the response to directed energy lasers and other threats to high performance optical sensors and the ability to eliminate selected and subsequent disrupted TDI sub-banks during a complete scan. In certain examples the scanner 100 may have the ability to accept an external trigger that will halt/suspend on focal plane digital TDI processing for the current sub-bank and all subsequent sub-banks as they scan across the location in image space of the threat. During the time the TDI processing is suspended, the ROIC 110 may shunt detector currents/charges away from the TDI registers. Rows may resume sub-bank TDI processing after all the sub-banks clear the location in image space of the threat.

Certain embodiments are directed to a programmable digital TDI EO/IR scanning focal plane array with multiple selectable TDI sub-banks arranged to have multiple spatially and/or spectrally dis-aggregated redundant bands for attenuating the response to directed energy lasers and other threats to high performance optical sensors and the ability to eliminate specific disrupted TDI sub-banks. As discussed above, in certain examples the scanner 100 has the ability to accept an external trigger and command set that will halt/suspend on focal plane digital TDI processing for a specific sub-bank as it scans across the location in image space of the threat. The sub-bank may resume TDI processing after it clears the location in image space of the threat. Embodiments provide the ability to more agilely eliminate only those sub-banks affected by threats. The scanner may respond to external control for excluding only the affected sub-banks at a time. Digital data may be provided from each TDI sub-bank with blanked frames excluded. In certain examples the deselection process lasts for a line time. In other examples the deselection process lasts for an integer number of line times. In other examples the deselection process lasts for an arbitrarily commanded amount of time and concludes on an integer number of line times.

Further embodiments are directed to a programmable digital TDI EO/IR scanning focal plane array with multiple selectable TDI sub-banks to provide a flexible general purpose scanner 100 arranged to mitigate the effects of lasers and various other threats to high performance optical sensors through the use of on focal plane digital filtering to autonomously select and add various signals as appropriate according to the threat signature.

According to certain embodiments, in addition to accepting commands to blank the TDI processes in the presence of threatening illumination patterns, the array 120 can be configured to determine if illumination patterns are present and self-suspend and resume TDI processing. In addition, certain embodiments include performing digital signal processing (e.g., using the ROIC 110 and/or controller 130) on the sub-bank data to extract information such as the lowest value in the sub-bank, the highest value in the sub-bank, the average of the lowest M-values in the sub-bank, or the average of the highest M-values in the sub-bank (where M is programmed integer value), and performing comparisons to longer term averages, such that individual sub-banks can make decisions to exempt pixels and or sub-banks from the TDI process. Digital filtering functions can be performed on the array 120 on a sub-bank basis. These filtering functions can be used to perform normal TDI operation (with the scanner being programmable as to the size of the TDI sub-bank, as discussed above), perform an averaging operation on the signal values of the pixels in the TDI sub-bank, find the lowest value in a sub-bank ("low-ball"), find the highest value in a sub-bank ("high-ball"), find the lowest values below a programmed threshold in a sub-bank ("threshold low"), and/or find the highest values above a programmed threshold in a sub-bank ("threshold high"). Based on the filtering results and logic of the arrangement, the controller 130, or another external device, can be alerted that a threat is occurring. In certain examples, based on filtering results and the logic of the arrangement, the scanner 100 can autonomously make decisions as to the collection approach to survive and operate in the presences of threats.

Figure 4:
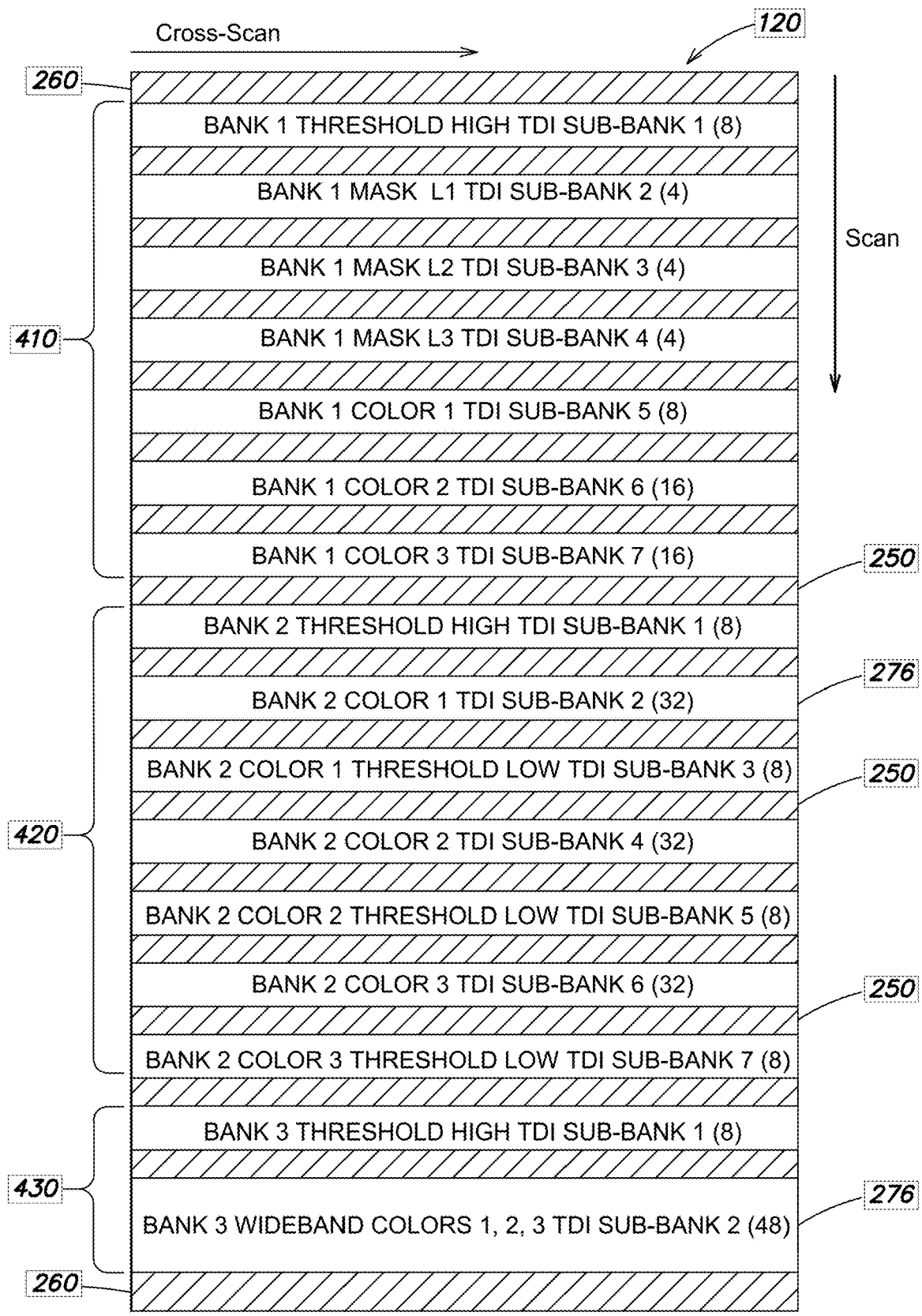
FIG. 4 is a block diagram of another example of an architecture for a scanning focal plane array according to certain embodiments.

Referring to FIG. 4 there is illustrated an example of an array configuration for an embodiment of the scanner 100 that includes an array 120 configured for three-color scanning with various levels masks laser detection, and varying TDI sub-banks 276. In this example, in the scan direction, there are three major banks 410, 420, 430. Each bank includes a plurality of sub-banks 276 with a gap 250 provided between each sub-bank. In the illustrated example, the scanner 100 can be configured such that the first bank 410 performs a characterization of the scene, the second bank 420 performs mission detection in three color bands and attempts to operate through a laser threat, and the third bank 430 performs very high sensitivity scanning over a broad band.

In this example, the first sub-bank 410 uses a "threshold high" feature over 8 rows to capture the most prominent data which may or may not have a laser threat present. If multiple values are captured that are above a threshold high value, this can be used as a measurement of the laser repetition rate. If the amplitude and pattern of the laser illumination meet programmed criteria, collection may be halted and the focal plane mode is autonomously shifted to a protected "safe state" for the duration of the scan through the first bank 410. If the amplitude and pattern do not meet criteria, then, three subsequent sub-banks 276 may use values of 4 rows in TDI to characterize certain structure(s) in the scene, providing information about the validity of data in the following rows. For example, in airborne or space-based imaging applications, the subsequent sub-banks may characterize cloud structure in the scene. For example, masks can be used to blank data processing on data from rows that may be obfuscated by presence of clouds in the scan. In the illustrated example, the next three sub-banks perform a first measurement of 16 in TDI collection of three discrete color bands.

Further in this example, the second banks 420 is the primary high sensitivity collection of the three color data collection. An initial sub-bank 276 of 8 rows (in this example) again performs laser presence detection using the high threshold test. The next sub-bank provides high sensitivity collection with 32 rows in TDI in a first color. Immediately following is a sub-bank performing the same color collection with only 8 rows in TDI, but with the on-board processing capability of providing the lowest data in the group of eight. If a laser pulse pattern is present, the lowest values below a certain threshold may contain valid non-disrupted data. Three colors can be collected in this manner to complete the second bank 420.

Further in this example, the third bank 430 is a wideband representation of the three color sub-bands. In this example, the first sub-bank of 8 rows in the third bank 430 again is used for laser presence detection using a "threshold high" filter. The remainder is a panchromatic band comprised of the three colors with 48 rows combined in TDI.

The above example demonstrates how embodiments of the scanner 100 and array 120 can be configured for multi-band (multi-color) high performance imaging, with certain rows of the array 120 used to determine whether a laser or other high-illumination source is present in the scene that could potentially disrupt the imaging performance. As discussed above, if such a threat is detected, the array 120 can be dynamically reconfigured and control to minimize the impact of the threat on the imaging performance of the scanner 100. Those skilled in the art will appreciate, given the benefit of this disclosure, that embodiments of the scanner 100 and array 120 are not limited to the example shown in FIG. 4 or discussed above. The array 120 can be configured with different banks, different numbers and sizes of sub-banks, etc., as discussed above. In addition, various sub-banks 276 can be configured for different types of imaging functions, not limited to the specific examples discussed above. For example, certain sub-banks 276 may be configured for single-color or multi-color high sensitivity imaging, whereas others may be configured for broad-band imaging, threat detection, of high-capacity imaging. The function, size, and/or location of any sub-bank 276 within the array 120 can be dynamically reconfigured as discussed above.

Certain embodiments are directed to a digital Programmable TDI EO/IR scanning focal plane array with multiple selectable TDI sub-banks 276 arranged to have multiple spatially and/or spectrally dis-aggregated redundant bands for attenuating the response to laser and other threats to high performance optical sensors and the ability to perform digital filtering for a variety of functions. For example, the ROIC 110 and/or circuitry included in the detectors 122 can be configured, optionally under control of the controller 130 or other system electronics, to autonomously perform digital filtering to provide warning flags or alerts, and/or low-level digital signal processing to provide relevant data in presence of laser threat effects. For example, referring again to FIG.

4, in certain examples, individual sub-banks 276 can be configured to autonomously detect when unusual and/or threatening illumination patterns are present (e.g., the "threshold high" sub-banks shown in FIG. 4).

In certain examples individual sub-banks 276 have the ability to perform low level digital signal processing to alert the scanner 100 when the sub-bank is "under threat" according to specified criteria. In certain examples the focal plane array 120 includes the ability to send data flags when certain conditions exist in the sub-bank TDI data. Digital filters may be used to control/suspend the TDI processing of individual sub-banks 276 as they cross the location in image space of the threat. Individual sub-banks TDI processing may be re-instated as sub-banks scan past the location in image space of the threat, as discussed above. This may reduce the impact of the threat on the imaging performance of the scanner 100. As discussed above, in certain examples, the ROIC 110 and/or circuitry included in the detectors 122 may be configured with the ability to perform digital processing functions, such as, but not limited to:

i. Low-ball, when commanded, the TDI sub-bank returns only the lowest value of the multiple sample of elements that would have comprised TDI value;

ii. High-ball, when commanded, the TDI sub-bank returns only the highest value of the multiple sample of elements that would have comprised TDI value;

iii. M-ball, when commanded, the TDI sub-bank returns only the sum of the M lowest values of the multiple sample of elements that would have comprised TDI value;

iv. Average, when commanded, the TDI sub-bank returns only the average value of the multiple sample of elements that would have comprised TDI value; and/or v. High M-Ball, when commanded, the TDI sub-bank returns only the sum of highest M values of the multiple sample of elements that would have comprised TDI value.

As discussed above, aspects and embodiments provide an approach to operating a scanning TDI sensor in the presence of threat environments (including lasers, natural space environmental phenomenology, and lightning, for example) that includes providing a distributed arrangement of TDI sub-banks 276 that can accommodate spatial, spectral, and temporal dis-aggregation and recombination and working in conjunction with an off-focal plane processor (e.g., the controller 130) to examine collected data to determine if TDI sub-banks data have been contaminated before re-combining. Embodiments provide for a scanning EO/IR TDI focal plane array 120 that can autonomously operate through threatening illumination patterns from lasers and other disruptive sources of charge and current by isolating in space and time the disruptive events. As discussed above, using embodiments of the flexible general purpose EO/IR TDI scanner 100, a normal bank can be divided into sub-banks, which can be individually controlled to participate in the TDI process or to isolate excess charge and/or current from the TDI process.

Thus, aspects and embodiments provide for a scanning EO/IR TDI focal plane array 120 and scanner 100 that can autonomously operate through threatening illumination patterns from lasers and other disruptive sources of charge and current by isolating in space and time the disruptive events. In addition to accepting commands to blank the TDI processes in the presence of threatening illumination patterns, the scanner 100 can determine if illumination patterns are present and self-suspend and resume TDI processing. Using several digital signal processing functions (such as Average, Low-Ball, Low M Ball, High Ball, High M-Ball, etc., as discussed above) and performing comparisons to longer term averages, individual sub-banks 276 can make decisions to exempt pixels and or sub-banks from the TDI process. As discussed above, the on-focal plane signal processing may perform alerts to the host system when various conditions are determined to have been met, including excessive signal in the sub-banks compared to long term averages and excessive signals in individual detectors within a sub-bank, for example. Using these alert signals, the scanner 100 may autonomously decide to suspend or re-instate TDI processing depending on the results of the digital filtering performed and the location of sub-banks relative to the threat location.

Aspects and embodiments allow the flexibility to program specific configurations into a generalized array 120 in terms of the number of banks and sub-banks of TDI, the number of rows in TDI in each bank/sub-bank, the size of the gaps between TDI banks (to accommodate filters or other components/features, for example), and the gain/capacity of the sub-banks. Further, this programming can be dynamic and autonomously adjusted to provide for robust scanner operation in the presence of a variety of threats or circumstance. As discussed above, when implemented with multispectral filters and/or neutral density filters, this physical programmability allows a very large dynamic range and highly flexible spectral configurations. Further, as discussed above, aspects and embodiments allow for individual detectors to be deselected from operation such that defective pixels do not contaminate the TDI process. Aspects and embodiments also allow for the ability to shut off unused ROIC rows to save power.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method of operating a Time Delay and Integration (TDI) scanning sensor that includes a focal plane array having a plurality of banks of imaging detectors, each bank divided into a plurality of sub-banks of the imaging detectors, the method comprising:

scanning a field of view of the sensor across a scene to be imaged;

collecting image data from each of the plurality of sub-banks;

analyzing the image data from each of the plurality of sub-banks to determine whether a sub-bank in the plurality of sub-banks has been contaminated by over-illumination from an illumination threat present in the scene to be imaged and identifying any contaminated sub-banks;

dynamically setting characteristics of the focal plane array, the characteristics including a location of at least one of the plurality of sub-banks, the location corresponding to locations of gap regions within the focal plane array;

shunting imaging detectors corresponding to the gap regions; and performing a TDI process on the image data to produce an image of the scene, wherein the image data from the contaminated sub-banks is excluded from the TDI process.

2. The method of claim 1, wherein analyzing the image data from each of the plurality of sub-banks includes comparing the image data from each sub-bank with the image data from each other sub-bank, and identifying a contaminated sub-bank based on differences in the comparison.

3. The method of claim 1, further comprising dynamically reconfiguring a number of the plurality of sub-banks included in each of the plurality of banks during the scanning.

4. The method of claim 3, further comprising dynamically configuring a gain state of at least one of the plurality of sub-banks during the scanning.

5. The method of claim 1, wherein dynamically setting the characteristics of the focal plane array includes dynamically setting a size of at least one of the plurality of sub-banks, the size corresponding to a number of rows of imaging detectors included in the respective sub-bank.

6. The method of claim 1, further comprising reprogramming at least one characteristic of the focal plane array.

7. The method of claim 6, wherein reprogramming the at least one characteristic of the focal plan array includes reprogramming the at least one characteristic of the focal plane array within a time period corresponding to a line rate of the scanning.

8. The method of claim 1, further comprising preventing excess charge over a saturation limit in at least one of the imaging detectors from being accumulated.

9. The method of claim 8, wherein preventing the excess charge over the saturation limit includes preventing the excess charge with a charge drain.

10. The method of claim 1, further comprising excluding saturated imaging detectors from the TDI process.

11. A method of operating a Time Delay and Integration (TDI) scanning sensor that includes a focal plane array having a plurality of banks of imaging detectors, each bank divided into a plurality of sub-banks of the imaging detectors, the method comprising:

scanning a field of view of the sensor across a scene to be imaged;

collecting image data from each of the plurality of sub-banks;

analyzing the image data from each of the plurality of sub-banks to determine whether a sub-bank in the plurality of sub-banks has been contaminated by over-illumination from an illumination threat present in the scene to be imaged and identifying any contaminated sub-banks, the analyzing including comparing the image data from each sub-bank with the image data from each other sub-bank and identifying a contaminated sub-bank based on differences in the comparison; and performing a TDI process on the image data to produce an image of the scene, wherein the image data from the contaminated sub-banks is excluded from the TDI process.

12. The method of claim 11, further comprising dynamically reconfiguring a number of the plurality of sub-banks included in each of the plurality of banks during the scanning.

13. The method of claim 12, further comprising dynamically configuring a gain state of at least one of the plurality of sub-banks during the scanning.

14. The method of claim 11, further comprising dynamically setting characteristics of the focal plane array.

15. The method of claim 14, wherein dynamically setting the characteristics of the focal plane array includes dynamically setting a size of at least one of the plurality of sub-banks, the size corresponding to a number of rows of imaging detectors included in the respective sub-bank.

16. The method of claim 11, further comprising reprogramming at least one characteristic of the focal plane array.

17. The method of claim 16, wherein reprogramming the at least one characteristic of the focal plan array includes reprogramming the at least one characteristic of the focal plane array within a time period corresponding to a line rate of the scanning.

18. The method of claim 11, further comprising preventing excess charge over a saturation limit in at least one of the imaging detectors from being accumulated.

19. The method of claim 18, wherein preventing the excess charge over the saturation limit includes preventing the excess charge with a charge drain.

20. The method of claim 11, further comprising excluding saturated imaging detectors from the TDI process.

\* \* \* \* \*

UNITED STATES PATENT AND TRADEMARK OFFICE
CERTIFICATE OF CORRECTION

| | |
|---|---|
| PATENT NO. | : 11,463,639 B2 |
| APPLICATION NO. | : 17/091689 |
| DATED | : October 4, 2022 |
| INVENTOR(S) | : Steven Botts et al. |

Page 1 of 1

It is certified that error appears in the above-identified patent and that said Letters Patent is hereby corrected as shown below:

In the Specification

Column 1, Lines 20-21, delete "This invention was made with government support. The government has certain rights in the invention." and insert --This invention was made with government support under contract FA9453-17-C-0038 awarded by the United States Air Force. The government has certain rights in the invention.--

Signed and Sealed this
Fifth Day of August, 2025

Coke Morgan Stewart
*Acting Director of the United States Patent and Trademark Office*